(12) United States Patent
Zou et al.

(10) Patent No.: US 9,531,653 B2
(45) Date of Patent: Dec. 27, 2016

(54) SYSTEMS AND METHODS FOR USER GROUP MANAGEMENT

(71) Applicant: Tencent Technology (Shenzhen) Company Limited, Shenzhen (CN)

(72) Inventors: Yi Zou, Shenzhen (CN); Lei Gao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 158 days.

(21) Appl. No.: 14/337,299

(22) Filed: Jul. 22, 2014

(65) Prior Publication Data

US 2014/0379828 A1 Dec. 25, 2014

Related U.S. Application Data

(63) Continuation of application No. PCT/CN2014/070475, filed on Jan. 10, 2014.

(30) Foreign Application Priority Data

Jun. 24, 2013 (CN) .......................... 2013 1 0254344

(51) Int. Cl.
*G06F 15/16* (2006.01)
*H04L 12/58* (2006.01)
*H04L 29/06* (2006.01)

(52) U.S. Cl.
CPC ......... *H04L 51/046* (2013.01); *H04L 65/1093* (2013.01); *H04L 65/4038* (2013.01)

(58) Field of Classification Search
USPC ....... 709/203, 204, 206, 217, 219, 223, 224, 709/226, 228, 232, 242; 715/753; 1/1
See application file for complete search history.

(56) References Cited

U.S. PATENT DOCUMENTS 6,957,229 B1 * 10/2005 Dyor ................. G06F 17/30873
709/223
6,996,605 B2 * 2/2006 Low ....................... G06Q 30/06
709/203

(Continued)

FOREIGN PATENT DOCUMENTS

| CN | 102082740 | 6/2011 |
| CN | 103297280 | 9/2013 |
| WO | WO 2010/118664 | 10/2010 |

OTHER PUBLICATIONS

Patent Cooperation Treaty, International Search Report, PCT/CN2014/070475, mailed Apr. 3, 2014.

(Continued)

*Primary Examiner* — Quang N Nguyen
(74) *Attorney, Agent, or Firm* — Jones Day

(57) ABSTRACT

Systems and methods are provided for user group management. For example, a contracting invitation for joining a user group and a first identifier of a first user from a first terminal associated with an administrator of the user group are received; a contracting-invitation page including a first indication message to request the first user to join the user group and a first interface element for inputting a contracting acceptance is generated; the contracting-invitation page is displayed on a second terminal associated with the first user to allow the first user to input the contracting acceptance via the interface element; the contracting acceptance is received from the second terminal; and the first identifier of the first user is added to a user list corresponding to the user group.

15 Claims, 12 Drawing Sheets

(56) References Cited

U.S. PATENT DOCUMENTS

| | | | | |
|---|---|---|---|---|
| 7,996,566 B1* | 8/2011 | Sylvain | ................... | H04N 7/15 |
| | | | | 709/217 |
| 9,306,880 B1* | 4/2016 | Hyndman | ............. | H04L 51/046 |
| 2008/0288494 A1* | 11/2008 | Brogger | ................. | G06Q 30/02 |
| 2013/0151637 A1* | 6/2013 | Bedikian | ................ | H04L 67/22 |
| | | | | 709/206 |
| 2014/0208234 A1* | 7/2014 | Amit | .................. | G06Q 30/0273 |
| | | | | 715/753 |

OTHER PUBLICATIONS

Patent Cooperation Treaty, Written Opinion of the International Searching Authority, PCT/CN2014/070475, mailed Apr. 3, 2014.
Patent Cooperation Treaty, International Preliminary Report on Patentability, PCT/CN2014/070475, issued Dec. 29, 2015.

* cited by examiner

SYSTEMS AND METHODS FOR USER GROUP MANAGEMENT

CROSS-REFERENCES TO RELATED APPLICATIONS

This application is a continuation of International Application No. PCT/CN2014/070475, with an international filing date of Jan. 10, 2014, now pending, which claims priority to Chinese Patent Application No. 201310254344.0, filed Jun. 24, 2013, both applications being incorporated by reference herein for all purposes.

BACKGROUND OF THE INVENTION

Certain embodiments of the present invention are directed to computer technology. More particularly, some embodiments of the invention provide systems and methods for communication technology. Merely by way of example, some embodiments of the invention have been applied to user groups. But it would be recognized that the invention has a much broader range of applicability.

With development of voice communication platforms, entertainment live-broadcast room services are often provided on many voice communication platforms. A user can register himself/herself as a host on a voice communication platform and use voice communication tools for live broadcast in a voice-chat room. For instance, the user who has registered as a host can perform singing or video broadcast in the voice-chat room of the voice communication platform to output certain contents to the voice communication platform. However, any user who registers as a host can output contents to the voice communication platform independently, which often results in certain difficulties for managing the voice communication platform and ineffective management of users.

Hence it is highly desirable to improve the techniques for user group management.

BRIEF SUMMARY OF THE INVENTION

According to one embodiment, a method is provided for user group management. For example, a contracting invitation for joining a user group and a first identifier of a first user from a first terminal associated with an administrator of the user group are received; a contracting-invitation page including a first indication message to request the first user to join the user group and a first interface element for inputting a contracting acceptance is generated; the contracting-invitation page is displayed on a second terminal associated with the first user to allow the first user to input the contracting acceptance via the interface element; the contracting acceptance is received from the second terminal; and the first identifier of the first user is added to a user list corresponding to the user group.

According to another embodiment, a device for user group management includes: a first receiving module, a first generation module, a first display module and an addition module. The first receiving module is configured to receive a contracting invitation for joining a user group and a first identifier of a first user from a first terminal associated with an administrator of the user group. The first generation module is configured to generate a contracting-invitation page including a first indication message to request the first user to join the user group and a first interface element for inputting a contracting acceptance. The first display module is configured to display the contracting-invitation page on a second terminal associated with the first user to allow the first user to input the contracting acceptance via the interface element. The first receiving module is further configured to receive the contracting acceptance from the second terminal. The addition module is configured to add the first identifier of the first user to a user list corresponding to the user group.

According to yet another embodiment, a non-transitory computer readable storage medium includes programming instructions for user group management. The programming instructions configured to cause one or more data processors to execute certain operations. For example, a contracting invitation for joining a user group and a first identifier of a first user from a first terminal associated with an administrator of the user group are received; a contracting-invitation page including a first indication message to request the first user to join the user group and a first interface element for inputting a contracting acceptance is generated; the contracting-invitation page is displayed on a second terminal associated with the first user to allow the first user to input the contracting acceptance via the interface element; the contracting acceptance is received from the second terminal; and the first identifier of the first user is added to a user list corresponding to the user group.

For example, the systems and methods described herein are configured to add users to user groups so that the users in each user group can be separately managed on the voice communication platform so as to ensure effective management of users and avoid difficulties associated with managing the voice communication platform.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
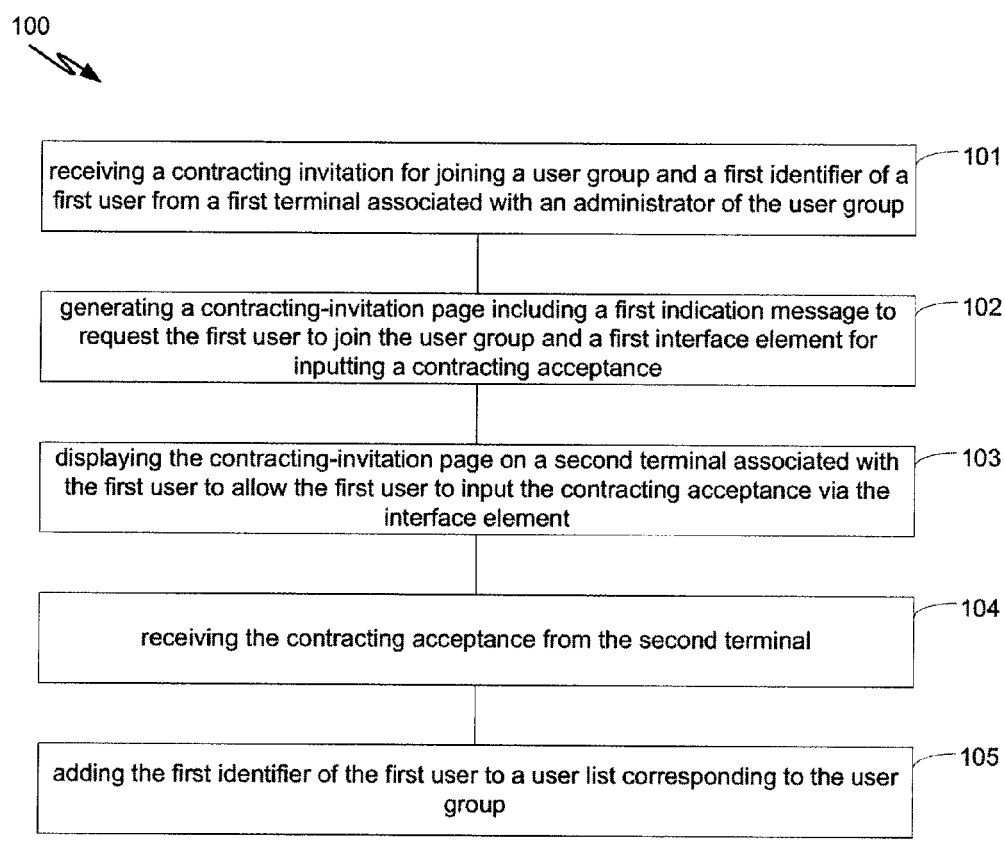
FIG. 1 is a simplified diagram showing a method for user group management according to one embodiment of the present invention.

FIG. 1 is a simplified diagram showing a method for user group management according to one embodiment of the present invention. This diagram is merely an example, which should not unduly limit the scope of the claims. One of ordinary skill in the art would recognize many variations, alternatives, and modifications. The method 100 includes at least the processes 101-105.

According to one embodiment, the process 101 includes: receiving a contract-signing invitation from a first terminal corresponding to the administrator and an identifier of a user. For example, the process 102 includes: generating a contracting-invitation page which contains an indication message to request the user to join the user group and an interface element for inputting a contracting acceptance. In another example, the process 103 includes: displaying the contracting-invitation page on a second terminal associated with the user to allow the user to input the contracting acceptance via the interface element. In yet another example, the process 104 includes: receiving the contracting acceptance sent by the second terminal. In yet another example, the process 105 includes: adding the identifier of the user to a user list corresponding to the user group.

Figure 2:
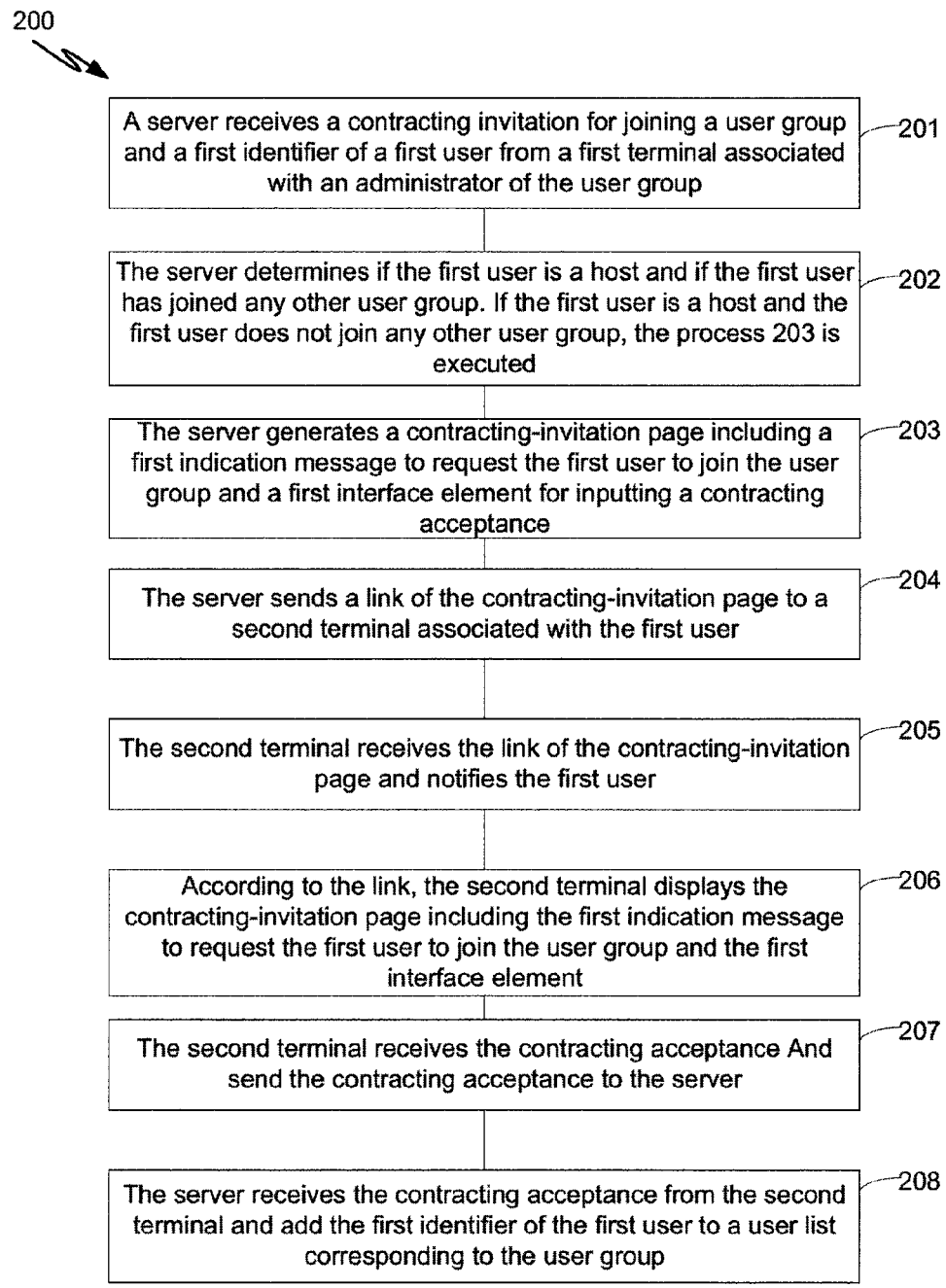
FIG. 2 is a simplified diagram showing a method for user group management according to another embodiment of the present invention.

FIG. 2 is a simplified diagram showing a method for user group management according to another embodiment of the present invention. This diagram is merely an example, which should not unduly limit the scope of the claims. One of ordinary skill in the art would recognize many variations, alternatives, and modifications. The method 200 includes at least the processes 201-208.

According to one embodiment, during the process 201: a server receives a contract-signing invitation from a first terminal associated with the administrator and an identifier of a user. For example, the administrator of the user group uses the administrator account to log in the server, and the server displays the contracting-invitation page on the first terminal corresponding to the administrator. In another example, the contracting-invitation page includes at least one interface element for inputting the identifier of the user and one interface element for inputting the contract-signing invitation. In yet another example, the contracting-invitation page may further include a name or an identifier of the user group and the interface element for inputting a contract-termination command. In yet another example, the administrator may input the identifier of the user into the interface element for inputting the identifier of the user. In yet another example, the administrator may click on the interface element for inputting the contract-signing invitation and input the contract-signing invitation into the first terminal. In yet another example, the first terminal receives the contract-signing invitation and the identifier of the user and sends the contract-signing invitation and the identifier of the user to the server. In yet another example, the server receives the contract-signing invitation and the identifier of the user sent by the first terminal.

According to another embodiment, the administrator may also input a contract period into the first terminal. For example, the administrator can input the contract period of 1 or 3 months into the first terminal, and the first terminal sends the contract period to the server. In another example, the interface element for inputting the identifier of the user includes an input box. In yet another example, the interface element for inputting the contract-signing invitation includes a button. In yet another example, the interface element for inputting the cancellation command includes a button.

Figure 3:
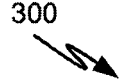
FIG. 3 is a simplified diagram showing an interface for contracting invitation according to one embodiment of the present invention.
Figure 3:
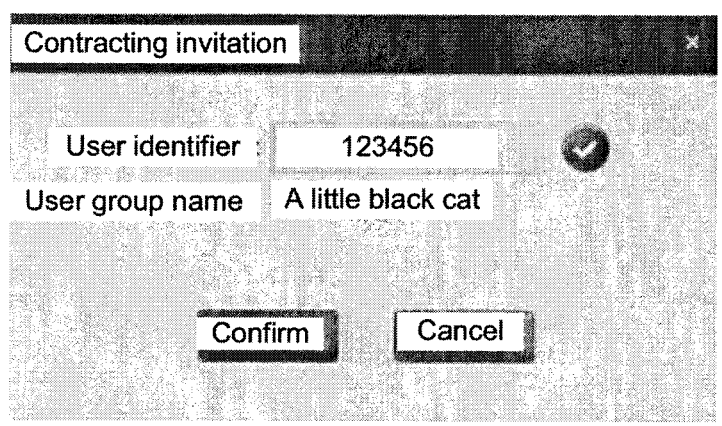

FIG. 3 is a simplified diagram showing an interface for contracting invitation according to one embodiment of the present invention. This diagram is merely an example, which should not unduly limit the scope of the claims. One of ordinary skill in the art would recognize many variations, alternatives, and modifications.

According to one embodiment, the interface for contracting invitation 300 includes an input box for inputting an identifier of a user, a "confirm" button for inputting a contract-signing invitation command and a "cancel" button for inputting a cancellation command. For example, the interface for contracting invitation 300 further includes a name of a user group "a little black cat." In another example, in the interface for contracting invitation 300, the administrator inputs the identifier of the user "123456" in the input box for inputting the identifier of the user and clicks "confirm" button to input the contract-signing invitation command into the first terminal. In yet another example, the first terminal receives the contract-signing invitation command that the administrator inputs by clicking the "confirm" button, obtains the identifier of the user "123456" from the input box for inputting the identifier of the user, and sends the contract-signing invitation and the identifier of the user "123456" to the server. In yet another example, the server receives the contract-signing invitation and the identifier of the user "123456."

Referring back to FIG. 2, during the process 202, the server determines if the user is a host and if the user has joined any other user group, and performs the process 203 if the user is a host and the user has not joined any other user group, in some embodiments. For example, the server searches the list of hosts according to the identifier of the user. The list of hosts stores user identifiers of all host users. If the identifier of the user is included in the list of hosts, the user is determined to be a host. Otherwise, the user is determined not to be a host. In another example, after determining the user as a host, the server determines whether the user identifier is associated with any user group identifier. If the user identifier is associated with another user group identifier, it is determined that the user has joined another user group. Otherwise, it is determined that the user has not joined any other user group. In yet another example, the method 200 is terminated if the user is not a host or the user has joined another user group. In yet another example, any user who intends to perform live broadcast in a voice-chat room may need to register himself/herself as a host in the server before performing live broadcast in the voice-chat room. In yet another example, after the user registers, the server adds the identifier of the user to the list of hosts. In yet another example, if any user joins a user group, the server stores the identifier of the user and the group identifier of the user group in a mapping between user identifiers and group identifiers.

In one embodiment, during the process 203, the server generates a contracting-invitation page which at least includes an indication message to request the user to join the user group and an interface element for inputting a contracting acceptance. For example, the server generates the indication message to request the user to join the user group and generates the contracting-invitation page that includes the indication message to request the user to join the user group according to a present time and the group name of the user group. In another example, the contracting-invitation page includes one interface element for inputting the refusal command. In yet another example, the interface element for inputting the acceptance includes a button; and the interface element for inputting the refusal command includes a button. In yet another example, the server set a timer for the user after generation of the contracting-invitation page. In yet another example, the server starts the timer which has a predetermined expiry time.

Figure 4:
FIG. 4 is a simplified diagram showing an interface for contracting invitation according to another embodiment of the present invention.

FIG. 4 is a simplified diagram showing an interface for contracting invitation according to another embodiment of the present invention. This diagram is merely an example, which should not unduly limit the scope of the claims. One of ordinary skill in the art would recognize many variations, alternatives, and modifications.

According to one embodiment, according to a present time Time1 and the group name of the user group "little black cat," the server generates the indication message to request the user to join the user group: "a little black cat invites you to join the user group at Time1," and generates a contracting-invitation page as shown in FIG. 4. For example, the contracting-invitation page includes the indication message to request the user to join the user group: "a little black cat invites you to join the user group at Time1." In another example, the contracting-invitation page also includes the "accept" button for accepting the invitation and the "refuse" button for refusing the invitation.

According to another embodiment, during process 204, the server sends a link of the contracting-invitation page to the second terminal associated with the user. For example, the server sends the link of the contracting-invitation page to the second terminal associated with the user according to the identifier of the user. In another example, the link of the contracting-invitation page includes a URL and other data of the contracting-invitation page. In yet another example, the server may directly send the link of the contracting-invitation page to the second terminal associated with the user after the contracting-invitation page is generated. In yet another example, the server may display the contracting-invitation page to the administrator and the administrator sends the link of the contracting-invitation page to the user by email or instant messaging.

According to yet another embodiment, during the process 205, the second terminal receives the link of the contracting-invitation page and prompts the user. For example, the second terminal may display a prompt box which may include a "confirm" button, and the prompt box is configured to prompt the user there exists a contracting-invitation page. In another example, the user clicks the "confirm" button in the prompt box to submit to the second terminal the display command to display the contracting-invitation page and the second terminal can display the contracting-invitation page after receiving the display command.

In one embodiment, during the process 206, the second terminal displays the contracting-invitation page according to the link of the contracting-invitation page, where the contracting-invitation page at least includes an indication message to request the user to join the user group and an interface element for inputting a contracting acceptance. For example, after the second terminal displays the contracting-invitation page, the user may click the interface element for inputting the acceptance on the contracting-invitation page to input the acceptance into the terminal. In another example, during the process 207, the second terminal receives the acceptance input by the user and sends the acceptance to the server.

In another embodiment, during the process 208, the server receives the acceptance and adds the identifier of the user into a user list corresponding to the user group. For example, the user may clicks on the interface element for inputting the refusal command on the contracting-invitation page to input the refusal command into the corresponding terminal. In another example, the second terminal receives the refusal command and sends the refusal command to the server. In yet another example, the server receives the refusal command and notifies the administrator. In yet another example, the server deletes the timer corresponding to the user after receiving the acceptance or the refusal command input by the user. In yet another example, after receiving the acceptance input by the user, the server may store the identifier of the user and the group identifier of the user group in the mapping between user identifiers and group identifiers. After the second terminal prompts the user, the user may do nothing if he does not want to join the user group. If the server does not receive any acceptance or refusal command from the user within the predetermined time period after the generation of the contracting-invitation page, it is determined that the user refuses to join the user group. In yet another example, if the timer corresponding to the user expires, the server determines that no acceptance or refusal command is received from the user within the predetermined time period after the generation of the contracting-invitation page.

Figure 5:
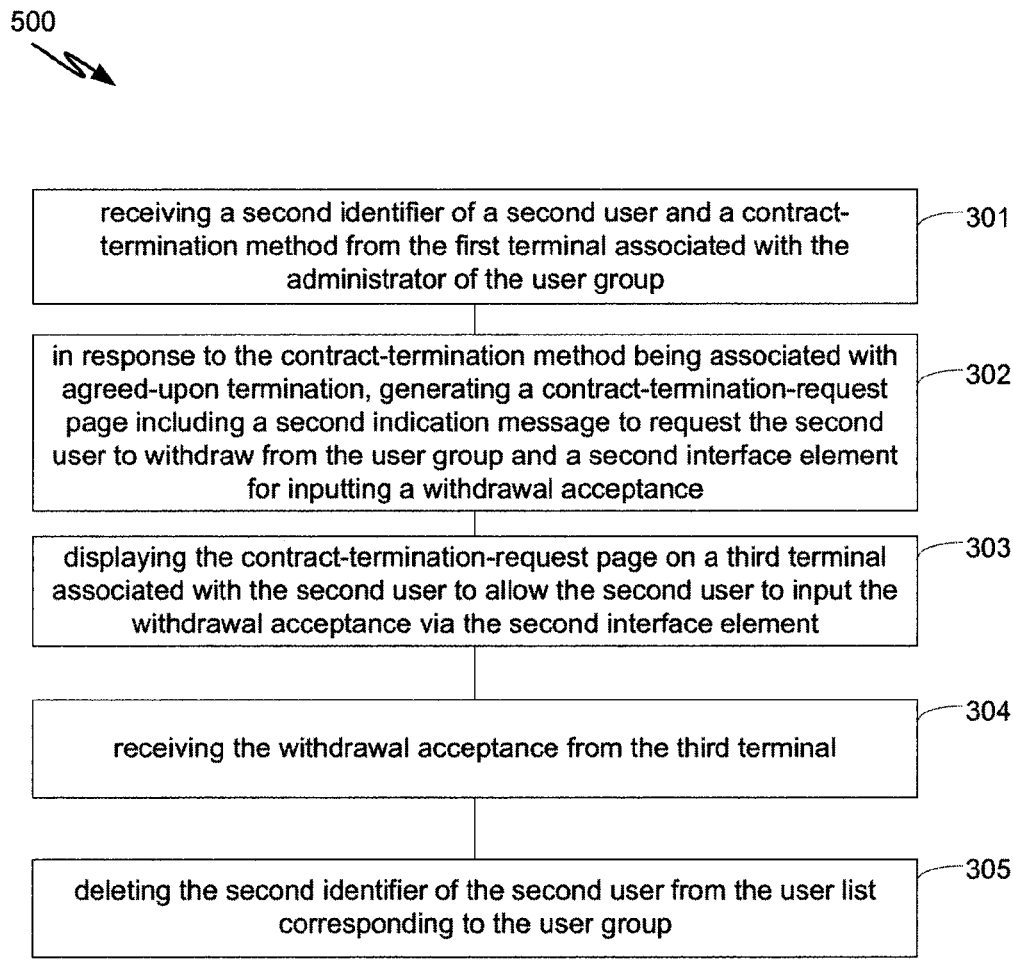
FIG. 5 is a simplified diagram showing a method for user group management according to yet another embodiment of the present invention.

FIG. 5 is a simplified diagram showing a method for user group management according to yet another embodiment of the present invention. This diagram is merely an example, which should not unduly limit the scope of the claims. One of ordinary skill in the art would recognize many variations, alternatives, and modifications. The method 500 includes at least the processes 301-305.

According to one embodiment, the process 301 includes: receiving an identifier of a user and a contract-termination method from a first terminal associated with the administrator. For example, the process 302 includes: generating a contract-termination-request page if the contract-termination method is agreed-upon termination, where the contract-termination-request page contains an indication message to request the user to withdraw from the user group and an interface element for inputting a withdrawal acceptance. In another example, the process 303 includes: displaying the contract-termination-request page on a second terminal associated with the user to allow the user to input the withdrawal acceptance via the interface element. In yet another example, the process 304 includes: receiving the withdrawal acceptance sent by the second terminal. In yet another example, the process 305 includes: deleting the identifier of the user from a user list corresponding to the user group.

Figure 6:
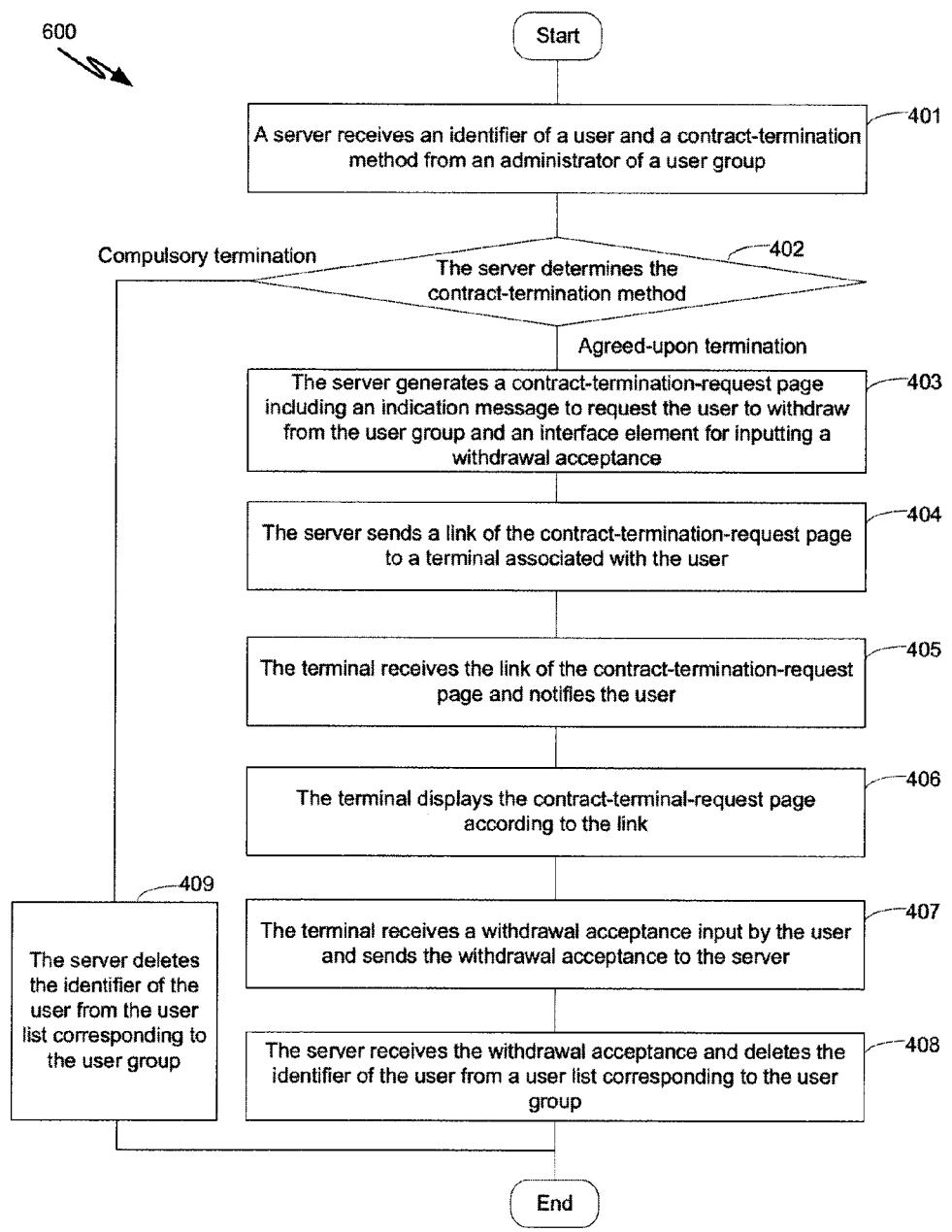
FIG. 6 is a simplified diagram showing a method for user group management according to yet another embodiment of the present invention.

FIG. 6 is a simplified diagram showing a method for user group management according to yet another embodiment of the present invention. This diagram is merely an example, which should not unduly limit the scope of the claims. One of ordinary skill in the art would recognize many variations, alternatives, and modifications. The method 600 includes at least the processes 401-409.

According to one embodiment, during process 401, a server receives an identifier of a user and a contract-termination method input by an administrator of a user group. For example, the administrator of the user group uses the administrator account to log in the server and opens the user list of the user group via a second terminal after login. In another example, the administrator selects one user from the user list as a user to be terminated, and then selects a contract-termination method for the user. Thereafter, the administrator inputs the identifier of the user and the contract-termination method into the terminal. As an example, the second terminal receives the identifier of the user and the contract-termination method input by the administrator and sends the identifier of the user and the contract-termination method to the server. For example, the contract-termination method includes agreed-upon termination and compulsory termination.

According to another embodiment, during the process 402, the server makes a determination on the contract-termination method. For example, the server executes the process 403 if the contract-termination method is agreed-upon termination, and executes the process 409 if the contract-termination method is compulsory termination. In another example, during the process 403, the server generates a contract-termination-request page which at least includes an indication message to request the user to withdraw from the user group and an interface element for inputting a withdrawal acceptance. In yet another example, the server may generate an indication message to request the user to withdraw from the user group and generate the contract-termination-request page that includes the indication message to request the user to withdraw from the user group according to a present time and the group name of the user group. In yet another example, the contract-termination-request page includes one interface element for inputting the withdrawal refusal command. In yet another example, the interface element for inputting the withdrawal acceptance includes a button, and the interface element for inputting the withdrawal refusal command includes a button. In yet another example, the server set a timer for the user after generation of the contracting-termination-request page. In yet another example, the server starts the timer which has a predetermined expiry time.

Figure 7:
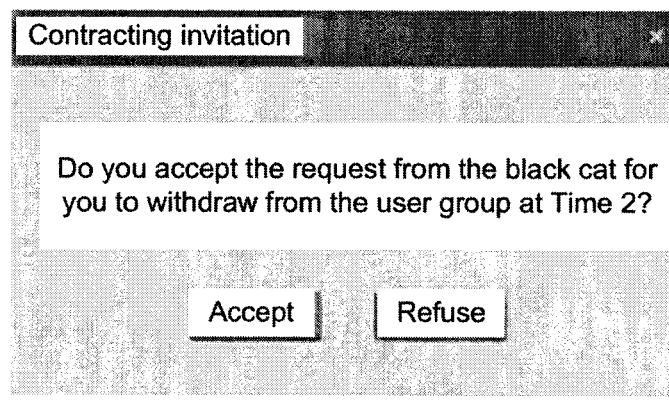
FIG. 7 is a simplified diagram showing an interface for contracting termination according to another embodiment of the present invention.

FIG. 7 is a simplified diagram showing an interface for contracting termination according to another embodiment of the present invention. This diagram is merely an example, which should not unduly limit the scope of the claims. One of ordinary skill in the art would recognize many variations, alternatives, and modifications.

According to a present time Time2 and a group name of a user group "a little black cat," a server generates an indication message to request a user to withdraw from the user group: "do you accept the request from a little black cat for you to withdraw from the user group at Time2?" in some embodiments. For example, the server generates a contract-termination-request page as shown in FIG. 7. In another example, the contract-termination-request page includes the indication message to request the user to withdraw from the user group: "do you accept the request from a little black cat for you to withdraw from the user group at Time2?", and an "accept" button for inputting a withdrawal acceptance and a "refuse" button for inputting a withdrawal refusal command.

Referring back to FIG. 6, during the process 404, the server sends a link of the contract-termination-request page to a first terminal corresponding to the user, in certain embodiments. For example, the server sends a link of the contract-termination-request page to a first terminal corresponding to the user according to the identifier of the user. In another example, the server may directly send the link of the contract-termination-request page to the first terminal corresponding to the user after the contract-termination-request page is generated. In yet another example, the server may display the contract-termination-request page to the administrator and the administrator sends the link of the contract-termination-request page to the user by email or instant messaging.

In one embodiment, during the process 405, the second terminal receives the link of the contract-termination-request page and prompts the user. For example, the terminal corresponding to the user may display a prompt box which may include a "confirm" button. In another example, the prompt box is configured to prompt the user there exists a contract-termination-request page, and the user may click the "confirm" button in the prompt box to submit to the second terminal a display command to display the contract-termination-request page. In yet another example, the second terminal can display the contract-termination-request page after receiving the display command.

In another embodiment, during the process 406, the second terminal displays the contract-termination-request page according to the link of the contract-termination-request page, where the contract-termination-request page at least includes an indication message to request the user to withdraw from the user group and an interface element for inputting a withdrawal acceptance. For example, after the second terminal displays the contract-termination-request page, the user may click the interface element for inputting the withdrawal acceptance on the contract-termination-request page to input the withdrawal acceptance into the terminal.

In yet another embodiment, during the process 407, the second terminal receives the withdrawal acceptance input by the user and sends the withdrawal acceptance to the server. For example, during the process 408, the server receives the withdrawal acceptance command and deletes the identifier of the user from a user list corresponding to the user group, and the operations associated with the method 600 end. In another example, the user may clicks on the interface element for inputting the withdrawal refusal command on the contract-termination-request page to input the withdrawal refusal command into the corresponding terminal. In yet another example, the second terminal receives the withdrawal refusal command and sends the withdrawal refusal command to the server, and the server receives the withdrawal refusal command and notifies the administrator. In yet another example, the server deletes the timer corresponding to the user after receiving the withdrawal acceptance or withdrawal refusal command input by the user. In yet another example, after the second terminal prompts the user, the user may do nothing if he does not want to withdraw from the user group. In yet another example, if the server does not receive any withdrawal acceptance or withdrawal refusal command input by the user within the predetermined time after generation of the contract-termination-request page, it is determined that the user refuses to withdraw from the user group. In yet another example, if the timer corresponding to the user expires, the server determines that no withdrawal acceptance or withdrawal refusal command is received from the user within the predetermined time after generation of the contract-termination-request page.

According to one embodiment, during process 409, the server deletes the identifier of the user from a user list corresponding to the user group and the operations associated with the method 600 end. For example, after deleting the identifier of the user from the user list corresponding to the user group, the server may delete the correspondence between the identifier of the user and the group identifier of the user group from the mapping between user identifiers and group identifiers.

Figure 8:
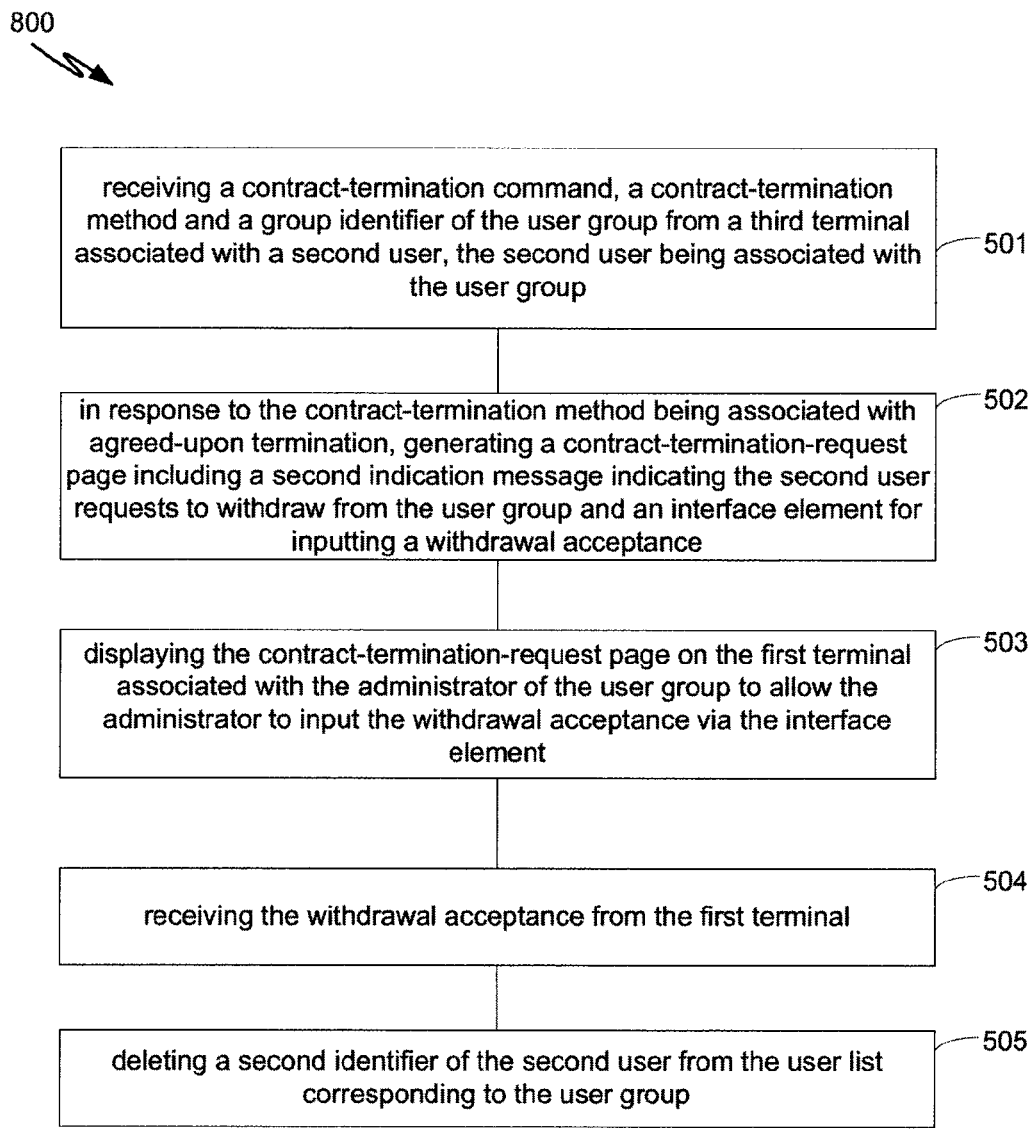
FIG. 8 is a simplified diagram showing a method for user group management according to yet another embodiment of the present invention.

FIG. 8 is a simplified diagram showing a method for user group management according to yet another embodiment of the present invention. This diagram is merely an example, which should not unduly limit the scope of the claims. One of ordinary skill in the art would recognize many variations, alternatives, and modifications. The method 800 includes at least the processes 501-505.

According to one embodiment, the process 501 includes: receiving a contract-termination command, a contract-termination method and a group identifier of a user group from a second terminal associated with a user. For example, the process 502 includes: generating a contract-termination-request page if the contract-termination method is agreed-upon termination, where the contract-termination-request page contains an indication message indicating the user requests to withdraw from the user group and an interface element for inputting a withdrawal acceptance. In another example, the process 503 includes: displaying the contract-termination-request page on a first terminal corresponding to an administrator of the user group to allow the administrator to input the withdrawal acceptance via the interface element. In yet another example, the process 504 includes: receiving the withdrawal acceptance from the first terminal. In yet another example, the process 505 includes: deleting the identifier of the user from a user list corresponding to the user group.

Figure 9:
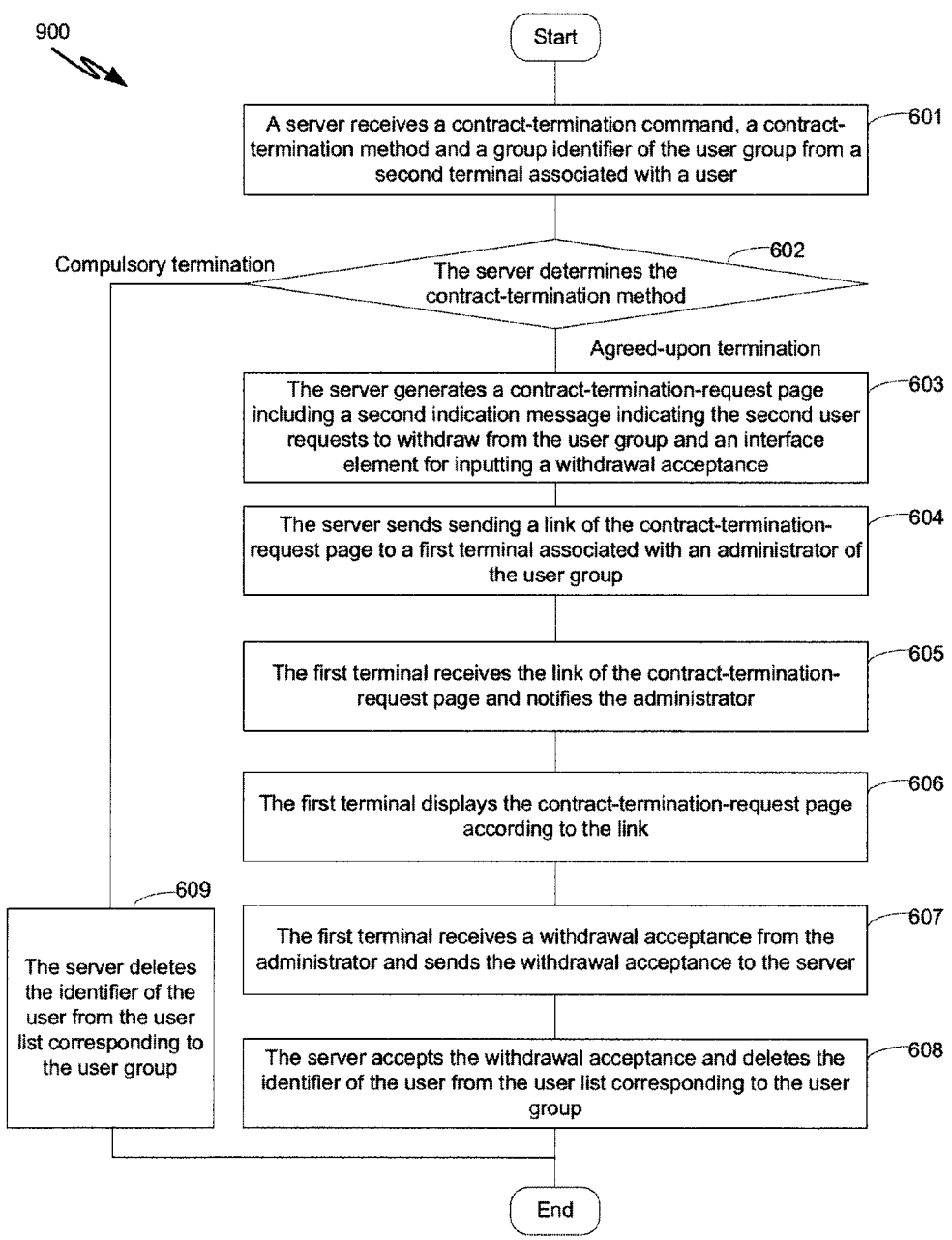
FIG. 9 is a simplified diagram showing a method for user group management according to yet another embodiment of the present invention.

FIG. 9 is a simplified diagram showing a method for user group management according to yet another embodiment of the present invention. This diagram is merely an example, which should not unduly limit the scope of the claims. One of ordinary skill in the art would recognize many variations, alternatives, and modifications. The method 900 includes at least the processes 601-609.

According to one embodiment, during the process 601, a server receives a contract-termination command, a contract-termination method and a group identifier of a user group from a second terminal corresponding to a user in a user group. For example, the contract-termination method includes agreed-upon termination and compulsory termination. In another example, the user in the user group may log into the server via a user account, and the server displays a user interface on the terminal corresponding to the user. In yet another example, the user interface includes the user group identifier of the user group to which the user belongs, agreed-upon termination, compulsory termination and an interface element for inputting the contract-termination command. The user may select the group identifier of the user group and a contract-termination method and click the interface element for inputting the contract-termination command to input the contract-termination command, the group identifier of the user group and the selected contract-termination method into the corresponding terminal. In yet another example, the second terminal receives the contract-termination command, the group identifier of the user group and the selected contract-termination method input by the user and sends the contract-termination command, the group identifier of the user group and the selected contract-termination method to the server.

According to another embodiment, during the process 602, the server determines the contract-termination method. For example, if the contract-termination method is agreed-upon termination, the server executes the process 603. In another example, if the contract-termination method is compulsory termination, the server executes the process 609. In yet another example, during the process 603, the server generates a contract-termination-request page which at least includes an indication message indicating the user requests to withdraw from the user group and an interface element for inputting a withdrawal acceptance. In yet another example, the server may generate an indication message indicating the user requests to withdraw from the user group and generate the contract-termination-request page that includes the indication message indicating the user requests to withdraw from the user group according to a present time and the group name of the user group. In yet another example, the contract-termination-request page includes one interface element for inputting the withdrawal refusal command. In yet another example, the interface element for inputting the withdrawal acceptance includes a button, and the interface element for inputting the withdrawal refusal command includes a button. In yet another example, the server sets a timer for the user after generation of the contract-termination-request page, where the timer has a predetermined expiry time.

According to yet another embodiment, during the process 604, the server sends a link of the contract-termination-request page to a first terminal corresponding to the administrator. For example, the server sends a link of the contract-termination-request page to a first terminal corresponding to the administrator according to the group identifier of the user group. In another example, the server may directly send the link of the contract-termination-request page to the terminal corresponding to the administrator after the contract-termination-request page is generated. In yet another example, the server may display the contract-termination-request page to the user and the user sends the link of the contract-termination-request page to the administrator by email or instant messaging.

In one embodiment, during the process 605, the first terminal receives the link of the contract-termination-request page and prompts the administrator. For example, the terminal corresponding to the administrator may display a prompt box which may include a "confirm" button. The prompt box is configured to prompt the administrator there exists a contract-termination-request page. The administrator may click the "confirm" button in the prompt box to submit to the first terminal the display command to display the contract-termination-request page and the first terminal can display the contract-termination-request page after receiving the display command.

In another embodiment, during the process 606, the first terminal displays the contract-termination-request page according to the link of the contract-termination-request page, where the contract-termination-request page at least includes an indication message indicating the user requests to withdraw from the user group and an interface element for inputting a withdrawal acceptance. For example, after the first terminal displays the contract-termination-request page, the administrator may click the interface element for inputting the withdrawal acceptance on the contract-termination-request page to input the withdrawal acceptance into the terminal. In another example, during the process 607, the first terminal receives the withdrawal acceptance input by the administrator and sends the withdrawal acceptance to the server. In yet another example, during the process 608, the server receives the withdrawal acceptance command and deletes the identifier of the user from a user list corresponding to the user group, and the operations associated with the method 900 end. In yet another example, the administrator may clicks on the interface element for inputting the withdrawal refusal command on the contract-termination-request page to input the withdrawal refusal command into the corresponding terminal. The terminal receives the withdrawal refusal command and sends the withdrawal refusal command to the server. The server receives the withdrawal refusal command and notifies the user. In yet another example, the server deletes the timer corresponding to the user group after receiving the withdrawal acceptance or withdrawal refusal command input by the administrator. In yet another example, after the first terminal prompts the administrator, the administrator may do nothing if he does not want the user to withdraw from the user group.

In yet another embodiment, if the server does not receive any withdrawal acceptance or withdrawal refusal command input by the administrator within a predetermined time period after generation of the contract-termination-request page, it is determined that the administrator refuses the user to withdraw from the user group. For example, if the timer corresponding to the user expires, the server determines that no withdrawal acceptance or withdrawal refusal command is received from the administrator within the predetermined time after generation of the contract-termination-request page. In another example, during the process 609, the server deletes the identifier of the user from a user list corresponding to the user group and the operations associated with the method 900 end. In yet another example, after deleting the identifier of the user from the user list corresponding to the user group, the server may delete the correspondence between the identifier of the user and the group identifier of the user group from the correspondence between user identifier and group identifier.

Figure 10:
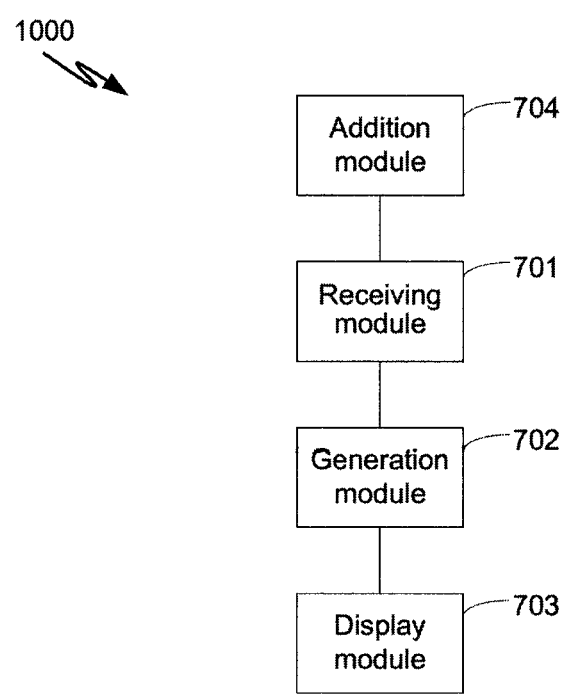
FIG. 10 is a simplified diagram showing a device for user group management according to one embodiment of the present invention.

FIG. 10 is a simplified diagram showing a device for user group management according to one embodiment of the present invention. This diagram is merely an example, which should not unduly limit the scope of the claims. One of ordinary skill in the art would recognize many variations, alternatives, and modifications. The device 1000 includes: a receiving module 701, a generation module 702, a display module 703, and an addition module 704.

According to one embodiment, the receiving module 701 is configured to receive a contracting invitation for joining a user group and a first identifier of a first user from a first terminal associated with an administrator of the user group. For example, the generation module 702 is configured to generate a contracting-invitation page including a first indication message to request the first user to join the user group and a first interface element for inputting a contracting acceptance. In another example, the display module 703 is configured to display the contracting-invitation page on a second terminal associated with the first user to allow the first user to input the contracting acceptance via the interface element. The receiving module 701 is further configured to receive the contracting acceptance from the second terminal. In yet another example, the addition module 704 is configured to add the first identifier of the first user to a user list corresponding to the user group.

According to another embodiment, the display module 703 is further configured to send a link of the contracting-invitation page to the second terminal associated with the first user based on at least information associated with the first identifier of the first user for the second terminal to display the contracting-invitation page based on at least information associated with the link of the contracting-invitation page. For example, the device 1000 also includes: a first determination module configured to determine if the first user is a host and if the first user has joined any other user group, and in response to the first user being a host and the first user not joining any other user group, generate the contracting-invitation page. In another example, the device 1000 also includes: a second determination module configured to, in response to no contracting acceptance being received from the second terminal with a predetermined time period after the contracting-invitation page is generated, determine that the first user rejects the contracting invitation for joining the user group.

Figure 11:
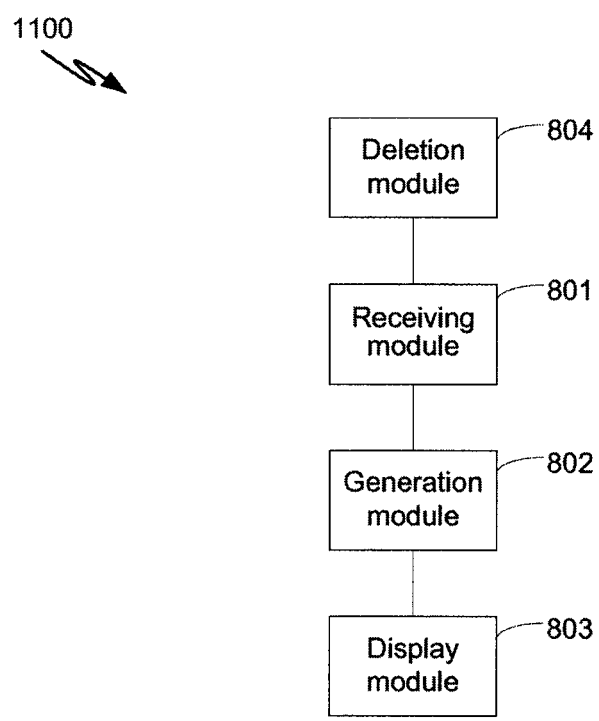
FIG. 11 is a simplified diagram showing a device for user group management according to another embodiment of the present invention.

FIG. 11 is a simplified diagram showing a device for user group management according to another embodiment of the present invention. This diagram is merely an example, which should not unduly limit the scope of the claims. One of ordinary skill in the art would recognize many variations, alternatives, and modifications. The device 1100 includes: a receiving module 801, a generation module 802, a display module 803, and a deletion module 804.

According to one embodiment, the receiving module 801 is configured to receive a second identifier of a second user and a contract-termination method from a first terminal associated with an administrator of a user group. For example, the generation module 802 is configured to, in response to the contract-termination method being associated with agreed-upon termination, generate a contract-termination-request page including a second indication message to request the second user to withdraw from the user group and a second interface element for inputting a withdrawal acceptance. In another example, the display module 803 is configured to display the contract-termination-request page on a third terminal associated with the second user to allow the second user to input the withdrawal acceptance via the second interface element. In yet another example, the receiving module 801 is further configured to receive the withdrawal acceptance from the third terminal. In yet another example, the deletion module 804 is configured to delete the second identifier of the second user from the user list corresponding to the user group.

Figure 12:
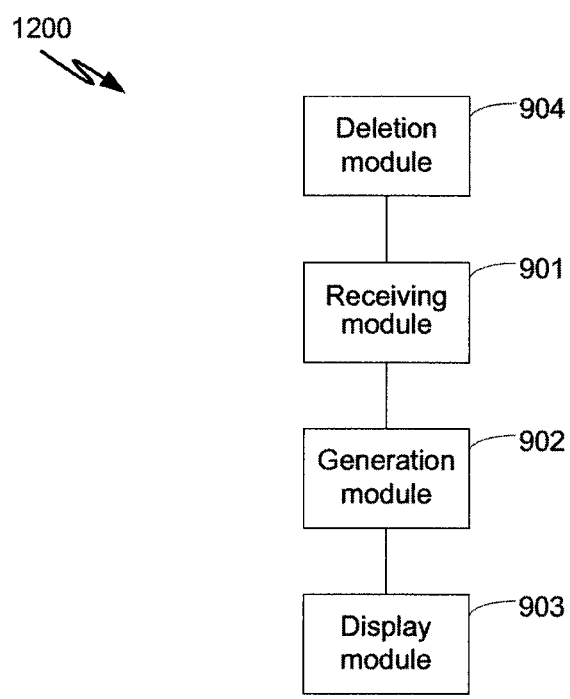
FIG. 12 is a simplified diagram showing a device for user group management according to yet another embodiment of the present invention.

According to another embodiment, the display module 803 is further configured to send a link of the contract-termination-request page to the third terminal associated with the second user based on at least information associated with the second identifier of the second user for the third terminal to display the contract-termination-request page based on at least information associated with the link of the contract-termination-request page. For example, the deletion module 804 is also configured to, in response to the contract-termination method being associated with compulsory termination, delete the second identifier of the second user from the user list corresponding to the user group. In another example, the device 1100 also includes: a determination module configured to, in response to no withdrawal acceptance being received from the third terminal within a predetermined time period after the contract-termination-request page is generated, determine that the second user refuses to withdraw from the user group FIG. 12 is a simplified diagram showing a device for user group management according to yet another embodiment of the present invention. This diagram is merely an example, which should not unduly limit the scope of the claims. One of ordinary skill in the art would recognize many variations, alternatives, and modifications. The device 1200 includes: a receiving module 901, a generation module 902, a display module 903, and a deletion module 904.

According to one embodiment, the receiving module 901 is configured to receive a contract-termination command, a contract-termination method and a group identifier of the user group from a third terminal associated with a second user, the second user being associated with the user group. For example, the generation module 902 is configured to, in response to the contract-termination method being associated with agreed-upon termination, generate a contract-termination-request page including a second indication message indicating the second user requests to withdraw from the user group and an interface element for inputting a withdrawal acceptance. In another example, the display module 903 is configured to display the contract-termination-request page on the first terminal associated with the administrator of the user group to allow the administrator to input the withdrawal acceptance via the interface element. In yet another example, the receiving module 901 is also configured to receive the withdrawal acceptance from the first terminal. In yet another example, the deletion module 904 is configured to delete a second identifier of the second user from the user list corresponding to the user group. In yet another example, the deletion module 904 is configured to, in response to the contract-termination method being associated with compulsory termination, delete the second identifier of the second user from the user list corresponding to the user group.

According to another embodiment, a method is provided for user group management. For example, a contracting invitation for joining a user group and a first identifier of a first user from a first terminal associated with an administrator of the user group are received; a contracting-invitation page including a first indication message to request the first user to join the user group and a first interface element for inputting a contracting acceptance is generated; the contracting-invitation page is displayed on a second terminal associated with the first user to allow the first user to input the contracting acceptance via the interface element; the contracting acceptance is received from the second terminal; and the first identifier of the first user is added to a user list corresponding to the user group. For example, the method is implemented according to at least FIG. 1 and/or FIG. 2.

According to yet another embodiment, a device for user group management includes: a first receiving module, a first generation module, a first display module and an addition module. The first receiving module is configured to receive a contracting invitation for joining a user group and a first identifier of a first user from a first terminal associated with an administrator of the user group. The first generation module is configured to generate a contracting-invitation page including a first indication message to request the first user to join the user group and a first interface element for inputting a contracting acceptance. The first display module is configured to display the contracting-invitation page on a second terminal associated with the first user to allow the first user to input the contracting acceptance via the interface element. The first receiving module is further configured to receive the contracting acceptance from the second terminal. The addition module is configured to add the first identifier of the first user to a user list corresponding to the user group. For example, the device is implemented according to at least FIG. 10.

According to yet another embodiment, a non-transitory computer readable storage medium includes programming instructions for user group management. The programming instructions configured to cause one or more data processors to execute certain operations. For example, a contracting invitation for joining a user group and a first identifier of a first user from a first terminal associated with an administrator of the user group are received; a contracting-invitation page including a first indication message to request the first user to join the user group and a first interface element for inputting a contracting acceptance is generated; the contracting-invitation page is displayed on a second terminal associated with the first user to allow the first user to input the contracting acceptance via the interface element; the contracting acceptance is received from the second terminal; and the first identifier of the first user is added to a user list corresponding to the user group. For example, the storage medium is implemented according to at least FIG. 1 and/or FIG. 2.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for user group management, the method comprising:
    receiving a contracting invitation for joining a user group and a first identifier of a first user from a first terminal associated with an administrator of the user group;
    determining if the first user is a host and if the first user has joined any other user group;
    in response to the first user being a host and the first user not joining any other user group, generating a contracting-invitation page including a first indication message to request the first user to join the user group and a first interface element for inputting a contracting acceptance;
    displaying the contracting-invitation page on a second terminal associated with the first user to allow the first user to input the contracting acceptance via the interface element;
    receiving the contracting acceptance from the second terminal; and
    adding the first identifier of the first user to a user list corresponding to the user group;
    wherein the displaying includes sending a link of the contracting-invitation page to the second terminal associated with the first user based on at least information associated with the first identifier of the first user for the second terminal to display the contracting-invitation page based on at least information associated with the link of the contracting-invitation page.

2. The method of claim 1, further comprising:
    in response to no contracting acceptance being received from the second terminal with a predetermined time period after the contracting-invitation page is generated, determining that the first user rejects the contracting invitation for joining the user group.

3. The method of claim 1, further comprising:
    receiving a second identifier of a second user and a contract-termination method from the first terminal associated with the administrator of the user group;
    in response to the contract-termination method being associated with agreed-upon termination,
        generating a contract-termination-request page including a second indication message to request the second user to withdraw from the user group and a second interface element for inputting a withdrawal acceptance;
        displaying the contract-termination-request page on a third terminal associated with the second user to allow the second user to input the withdrawal acceptance via the second interface element;
        receiving the withdrawal acceptance from the third terminal; and
        deleting the second identifier of the second user from the user list corresponding to the user group.

4. The method of claim 3, wherein the displaying the contract-termination-request page on a third terminal associated with the second user includes:
    sending a link of the contract-termination-request page to the third terminal associated with the second user based on at least information associated with the second identifier of the second user for the third terminal to display the contract-termination-request page based on at least information associated with the link of the contract-termination-request page.

5. The method of claim 3, further comprising:
    in response to the contract-termination method being associated with compulsory termination, deleting the second identifier of the second user from the user list corresponding to the user group.

6. The method of claim 3, further comprising:
    in response to no withdrawal acceptance being received from the third terminal within a predetermined time period after the contract-termination-request page is generated, determining that the second user refuses to withdraw from the user group.

7. The method of claim 1, further comprising:
    receiving a contract-termination command, a contract-termination method and a group identifier of the user group from a third terminal associated with a second user, the second user being associated with the user group;
    in response to the contract-termination method being associated with agreed-upon termination,
        generating a contract-termination-request page including a second indication message indicating the second user requests to withdraw from the user group and an interface element for inputting a withdrawal acceptance;

displaying the contract-termination-request page on the first terminal associated with the administrator of the user group to allow the administrator to input the withdrawal acceptance via the interface element;

receiving the withdrawal acceptance from the first terminal; and deleting a second identifier of the second user from the user list corresponding to the user group.

8. A device for user group management, the device comprising:

one or more data processors coupled to a non-transitory computer-readable storage medium having stored thereon program instructions configured to be executed by the one or more data processors to:

receive a contracting invitation for joining a user group and a first identifier of a first user from a first terminal associated with an administrator of the user group;

determine if the first user is a host and if the first user has joined any other user group;

in response to the first user being a host and the first user not joining any other user group, generate a contracting-invitation page including a first indication message to request the first user to join the user group and a first interface element for inputting a contracting acceptance;

display the contracting-invitation page on a second terminal associated with the first user to allow the first user to input the contracting acceptance via the interface element;

receive the contracting acceptance from the second terminal; and add the first identifier of the first user to a user list corresponding to the user group;

wherein the displaying operation includes to send a link of the contracting-invitation page to the second terminal associated with the first user based on at least information associated with the first identifier of the first user for the second terminal to display the contracting-invitation page based on at least information associated with the link of the contracting-invitation page.

9. The device of claim 8, further configured to, in response to not contracting acceptance being received from the second terminal with a predetermined time period after the contracting-invitation page is generated, determine that the first user rejects the contracting invitation for joining the user group.

10. The device of claim 8, further configured to:

receive a second identifier of a second user and a contract-termination method from the first terminal associated with the administrator of the user group;

in response to the contract-termination method being associated with agreed-upon termination, generate a contract-termination-request page including a second indication message to request the second user to withdraw from the user group and a second interface element for inputting a withdrawal acceptance;

display the contract-termination-request page on a third terminal associated with the second user to allow the second user to input the withdrawal acceptance via the second interface element;

receive the withdrawal acceptance from the third terminal; and delete the second identifier of the second user from the user list corresponding to the user group.

11. The device of claim 10, further configured to send a link of the contract-termination-request page to the third terminal associated with the second user based on at least information associated with the second identifier of the second user for the third terminal to display the contract-termination-request page based on at least information associated with the link of the contract-termination-request page.

12. The device of claim 10, further configured to, in response to the contract-termination method being associated with compulsory termination, delete the second identifier of the second user from the user list corresponding to the user group.

13. The device of claim 10, further configured to, in response to no withdrawal acceptance being received from the third terminal within a predetermined time period after the contract-termination-request page is generated, determine that the second user refuses to withdraw from the user group.

14. The device of claim 8, further configured to:

receive a contract-termination command, a contract-termination method and a group identifier of the user group from a third terminal associated with a second user, the second user being associated with the user group;

in response to the contract-termination method being associated with agreed-upon termination, generate a contract-termination-request page including a second indication message indicating the second user requests to withdraw from the user group and an interface element for inputting a withdrawal acceptance;

display the contract-termination-request page on the first terminal associated with the administrator of the user group to allow the administrator to input the withdrawal acceptance via the interface element;

receive the withdrawal acceptance from the first terminal; and delete a second identifier of the second user from the user list corresponding to the user group.

15. A non-transitory computer readable storage medium comprising program instructions for user group management, the program instructions configured to cause one or more data processors to execute operations comprising:

receiving a contracting invitation for joining a user group and a first identifier of a first user from a first terminal associated with an administrator of the user group;

determining if the first user is a host and if the first user has joined any other user group;

in response to the first user being a host and the first user not joining any other user group, generating a contracting-invitation page including a first indication message to request the first user to join the user group and a first interface element for inputting a contracting acceptance;

displaying the contracting-invitation page on a second terminal associated with the first user to allow the first user to input the contracting acceptance via the interface element;

receiving the contracting acceptance from the second terminal; and adding the first identifier of the first user to a user list corresponding to the user group;

wherein the displaying operation includes sending a link of the contracting-invitation page to the second terminal associated with the first user based on at least information associated with the first identifier of the first user for the second terminal to display the contracting-invitation page based on at least information associated with the link of the contracting-invitation page.

* * * * *